US007613745B2

(12) United States Patent
Letkeman et al.

(10) Patent No.: US 7,613,745 B2
(45) Date of Patent: Nov. 3, 2009

(54) METHOD OF ALIGNING META-MODELS

(75) Inventors: Kim Letkeman, Nepean (CA); Oleksiy Grygoryev, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 11/753,622

(22) Filed: May 25, 2007

(65) Prior Publication Data

US 2008/0294702 A1    Nov. 27, 2008

(51) Int. Cl.
   *G06F 17/00*    (2006.01)
(52) U.S. Cl. .................. 707/203; 707/204; 707/102; 707/101; 707/100; 707/103 R
(58) Field of Classification Search .................. 707/203, 707/204, 103 R
   See application file for complete search history.

(56) References Cited

U.S. PATENT DOCUMENTS

| | | | |
|---|---|---|---|
| 6,415,299 B1 * | 7/2002 | Baisley et al. ............ | 707/203 |
| 6,502,112 B1 * | 12/2002 | Baisley ................... | 707/203 |
| 6,539,396 B1 * | 3/2003 | Bowman-Amuah ..... | 707/103 R |
| 6,598,219 B1 | 7/2003 | Lau | |
| 6,678,882 B1 | 1/2004 | Hurley et al. | |
| 6,904,588 B2 | 6/2005 | Reddy et al. | |
| 2005/0149583 A1 | 7/2005 | Baskaran et al. | |

OTHER PUBLICATIONS

The Meta-Object Facility Typed Iman Poernomo 2006.*
Rich Meta Object Facility Kitakyushu, Japan Oct. 27-31, 2008.*
Kurtev, I., Bezivin, J., Jouault, F., & Valduriez, P., "Model-based DSL Frameworks." OOPSLA '06, Oct. 22-26, 2006, Oregon. pp. 602-615.
Mehra, A., Grundy, J., Hosking, J., "A Generic Aproach to Supporting Diagram Differencing and Merging for Collaborative Design." ASE '05, Nov. 7-11, 2005, California. pp. 204-213.
Melnik, S., Rahm, E., Bernstein, P., "Rondo: A Programming Platform for Generic Model Management." SIGMOD 2003, Jun. 9-12, 2003, California. pp. 193-213.
Terrasse, M., Savonnet, M., & Becker, G., "Do We Need Metamodels and Ontologies for Engineering Platforms?" GaMMa '06, May 22, 2006, Shanghai. pp. 21-27.

* cited by examiner

*Primary Examiner*—Sana Al-Hashemi
(74) *Attorney, Agent, or Firm*—Hoffman Warnick LLC

(57) ABSTRACT

A system and method for processing meta-models defined in accordance with Meta Object Facility (MOF). A system is provided that includes: a version control system for checking meta-models in and out of a model repository; a system for merging two versions of a meta-model that are based on a common ancestor version and were worked on in parallel; and an alignment system for aligning the two versions and the common ancestor whenever a profile has been applied differently to any of the two versions and common ancestor version.

20 Claims, 4 Drawing Sheets

METHOD OF ALIGNING META-MODELS

FIELD OF THE INVENTION

The invention relates generally to meta-models, and more particularly to a system and method for aligning meta-models that are defined using the Meta Object Facility (MOF).

BACKGROUND OF THE INVENTION

The Meta Object Facility (MOF) is an Object Management Group (OMG) standard for Model Driven Engineering. MOF is used to define model structures based on a meta-model, which specifies the elements and fields that can be present in an instance of the model. Each element is typed, and each element can contain one or more "structural features" that are also typed.

Additionally, the meta-model can be extended by the creation and application of a profile, which contains stereotypes that can be used to extend the structural features of any element. These profiles and stereotypes change the structure of any model and element to which they are applied. To complicate matters, it is possible to apply a profile to an individual package at any level of the model's hierarchy of packages. And to further complicate matters, a package may be moved in a contributor model such that some contained packages for which a profile was in scope are no longer covered by that profile. A final complication is the fact that each of these profiles can be at a different version, depending on whether the specific user chose to upgrade to a newly released profile or not.

In order for two models that were worked in parallel to be comparable, their meta-models must be fully aligned, i.e., the same profiles at the same versions must be applied to the same packages at the same level in the total hierarchy. While more advanced version control systems used in modeling provide automated merge facilities, they do not incorporate automated processes for aligning meta-models. Instead, existing techniques require the realignment to be done manually in which the models are compared and merged in a tedious manual operation done outside the scope of the automated merge facilities. This is extremely inconvenient and error-prone. Accordingly, a need exists for an automated system for aligning meta-models.

SUMMARY OF THE INVENTION

The present invention addresses the above-mentioned problems, as well as others, by providing an automated system and method for aligning meta-model in a Meta Object Facility (MOF) environment.

In a first aspect, the invention provides a system for processing meta-models defined in accordance with Meta Object Facility (MOF), comprising: a version control system for checking meta-models in and out of a model repository; a system for merging two versions of a meta-model that are based on a common ancestor version and were worked on in parallel; and an alignment system for aligning the two versions and the common ancestor whenever a profile has been applied differently to any of the two versions and common ancestor version.

In a second aspect, the invention provides a computer program product stored on a computer readable medium, which when executed by a computer system, processes meta-models, the computer program product comprising: program code configured for checking meta-models in and out of a model repository; program code configured for merging two versions of a meta-model that are based on a common ancestor and were worked on in parallel; and program code configured for aligning the two versions and the common ancestor whenever a profile has been applied differently to any of the two versions and common ancestor.

In a third aspect, the invention provides a method for aligning instances of a meta-model within a meta-model processing system, comprising: providing an interface for checking meta-models in and out of a model repository; merging two versions of a meta-model that are based on a common ancestor and were worked on in parallel when a second one of the two versions is being checked back in; and aligning the two versions and the common ancestor whenever a profile has been applied differently to any of the two versions and common ancestor.

In a fourth aspect, the invention provides a method for deploying a system for aligning meta-models, comprising: providing a computer infrastructure being operable to: provide an interface for checking meta-models in and out of a model repository; merge two versions of a meta-model that are based on a common ancestor and were worked on in parallel when a second one of the two versions is being checked back in; and align the two versions and the common ancestor whenever a profile has been applied differently to any of the two versions and common ancestor.

In a fifth aspect, the invention provides a system for processing meta-models, comprising: a system for comparing two versions of a model; and an alignment system for aligning associated meta-models of the two versions whenever a profile has been applied differently, wherein the alignment system includes a version mismatch system for recognizing if different profile versions are being applied to like packages within different versions of the meta-model, and for adjusting each like package within the different versions of the meta-model to a most recent profile version.

This meta-model alignment process described herein allows an automated merge process to proceed transparently, hoisting all profile applications up to a level at which they are common again and upgrading them to the latest version in memory. Advantages include the fact that the user can complete the merge at the appropriate time (e.g., during a delivery) instead of stopping the whole process and pulling out the contributors and manually adjusting a final merge result.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
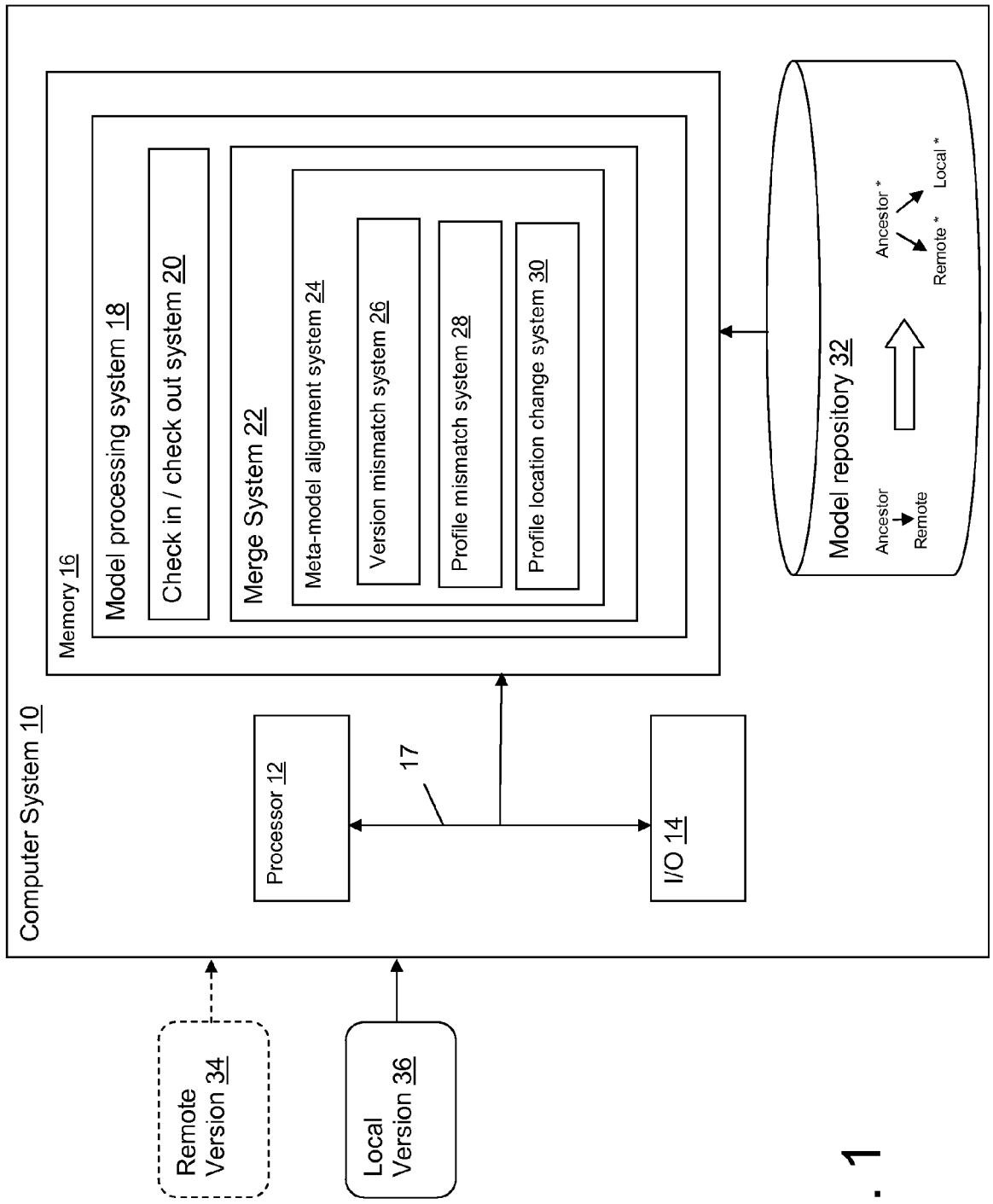
FIG. 1 depicts a computer system having a meta-model alignment system in accordance with an embodiment of the present invention.

FIG. 1 depicts a computer system having a model processing system 18 for processing, controlling, storing and managing meta-models. In particular, model processing system 18 handles the case where two versions that are based on a common ancestor meta-model version are checked out of a model repository 32, are worked on, and are sequentially checked back in requiring a compare/merge operation. More particularly, model processing system 18 handles the situation where a profile has been applied differently to any of the two versions and the ancestor version.

For clarity purposes, it is noted that technically users check in/check out and modify actual models or model files, while the systems, methods and computer programs described herein process the model's underlying structure through its associated meta-model. Accordingly, while a user deals with models, the systems, programs and methods described herein deal with the model's structurally-defining meta-models. Thus, while the term "meta-model" is used throughout this document to describe and claim the various embodiments, it is understood that from a user's perspective, the term "model" may be substituted without changing the scope or intent of the disclosure.

In this illustrative embodiment, model processing system 18 includes: (1) a check in/checks out system 20 for allowing users to check meta-models into and out of model repository 32; and (2) a merge system 22 that automatically compares/merges different versions of a meta-model having a common ancestor version, which have been worked on in parallel by end users.

Included in merge system 22 is a meta-model alignment system 24 that aligns a local, remote, and ancestor version of a meta-model. The ancestor version is the original or common instance of the meta-model stored in the model repository 32. The remote version 34 and the local version 36 are two instances or copies of the original ancestor version that were checked out and modified. The remote version 34, which is the first version to be checked back in, does not require a merge/compare operation and is simply checked back in as a branch to the ancestor version. The local version 36, which is the second version to be checked back in, requires a merge/compare operation to ensure that the changes made to both the remote and local versions are incorporated. Merge system 22 provides a process for allowing such a three-way merge of the ancestor, remote, and local meta-model versions.

When the model processing system 18 detects the need for a three way merge, meta-model alignment system 24 checks the meta-models for profile alignment and then normalizes them such that each model has identical structures and are thus fully comparable. Namely, if any one of the remote, local or ancestor version have a profile that is applied differently than the others, meta-model alignment system 24 aligns the profiles for each version.

The meta-model alignment system 24 includes a version mismatch system 26, a profile mismatch system 28, and a profile location change system 30 that check for and handle each of: (1) version mismatch; (2) profile mismatch; and (3) profile location change, respectively.

Version Mismatch

Figure 2:
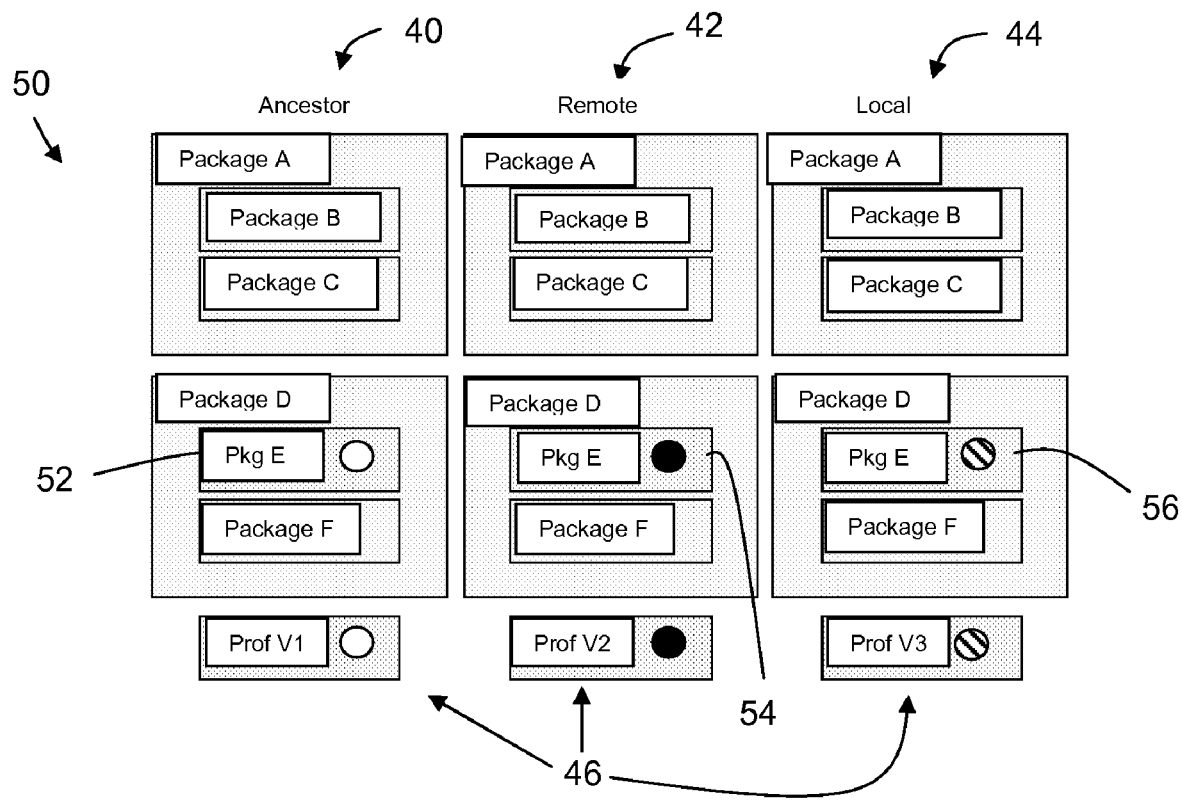
FIG. 2 depicts an illustration of normalizing profiles at different versions in accordance with an embodiment of the present invention.
Figure 2:
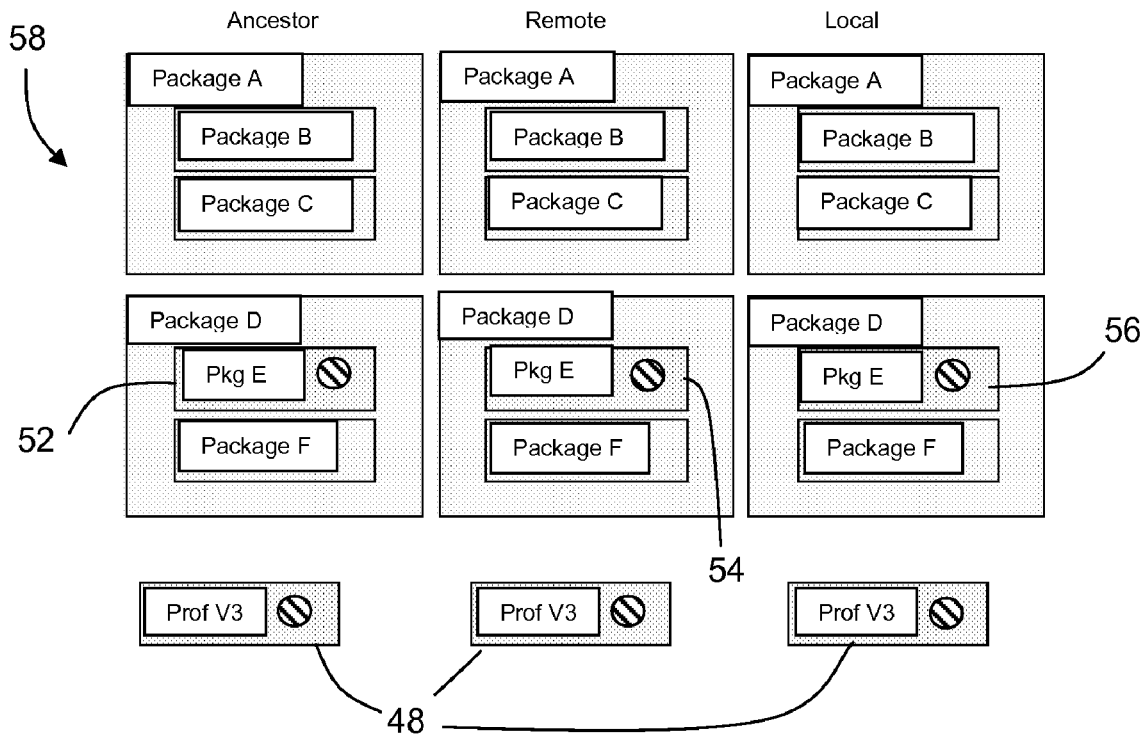

FIG. 2 depicts an example of how version mismatch is handled and shows a before 50 and after 58 representation of an ancestor 40, remote 42 and local 44 version of a meta-model. In this example, there are three different profile versions 46 (V1, V2, and V3) being applied to package E within the model. Namely, ancestor package E 52 has version V1, remote package E has version V2, and local package E has V3, the most recent version.

When a version mismatch occurs, version mismatch system 26 (FIG. 1) loads the version of the profile it can see at the path specified, and verifies that this profile is versioned equal to or greater than any of the versions that have been applied in the three models.

If an equal or greater version is not visible at the correct location, the user is warned and the merge is aborted. Otherwise, each of the applied profile applications is upgraded in memory to the latest version. As can be seen in the after representation 58 of FIG. 2, package E in each of the models has been upgraded to profile version V3 48.

Thus, version mismatch system 26 (FIG. 1) recognizes if different profile versions are being applied to "like" packages within different versions of the meta-model, and adjusts each "like" package within the different versions of the meta-model to a most recent profile version.

Profile Mismatch

Figure 3:
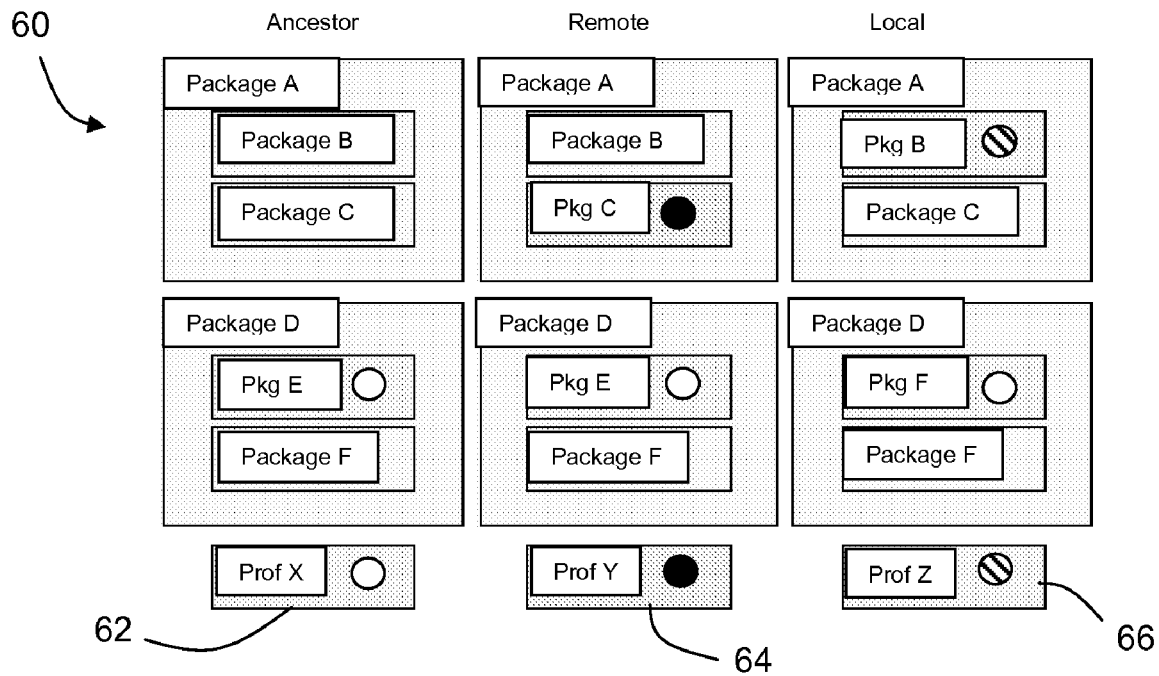
FIG. 3 depicts an illustration of normalizing mismatched profiles in accordance with an embodiment of the present invention.
Figure 3:
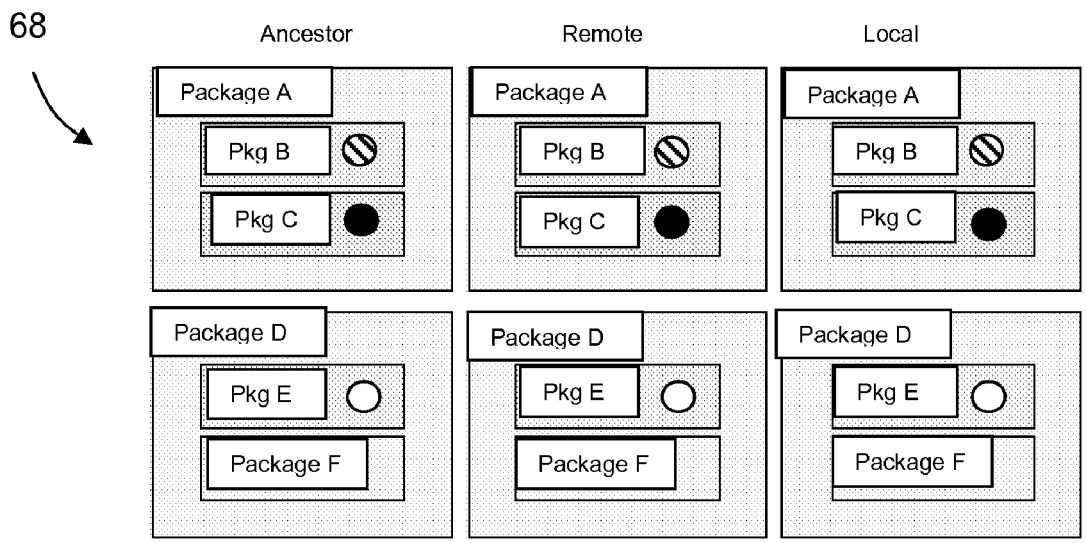

FIG. 3 depicts an example of how profile mismatch is handled and shows a before 60 and after 68 representation of an ancestor, remote and local version of a meta-model. In this example, there are three different profiles, profile X 62, profile Y 64 and profile Z 66. Profile X 62 is applied to package E in each model, profile Y 64 is applied to package C of the remote meta-model, and profile Z is applied to package B of the local meta-model.

Profile mismatch system 28 (FIG. 1) causes each profile (e.g., X, Y, Z) in any of the models to be propagated to all of the models (ancestor, remote, and local) in exactly the same place, whether or not they are used. This allows the merge/compare process to crawl equivalent meta-model extensions while scanning each of the model elements.

As can be seen in the after representation 68 at the bottom of FIG. 3, each package E contains profile X, each package C now contains profile Y, and each package B now contains profile Z.

Thus, profile mismatch system 28 (FIG. 1) recognizes if different profiles are being applied to "like" packages within different versions of the meta-model, and ensures that the "like" packages within each of the different versions of the meta-model utilize a common profile.

Profile Location Change

Figure 4:
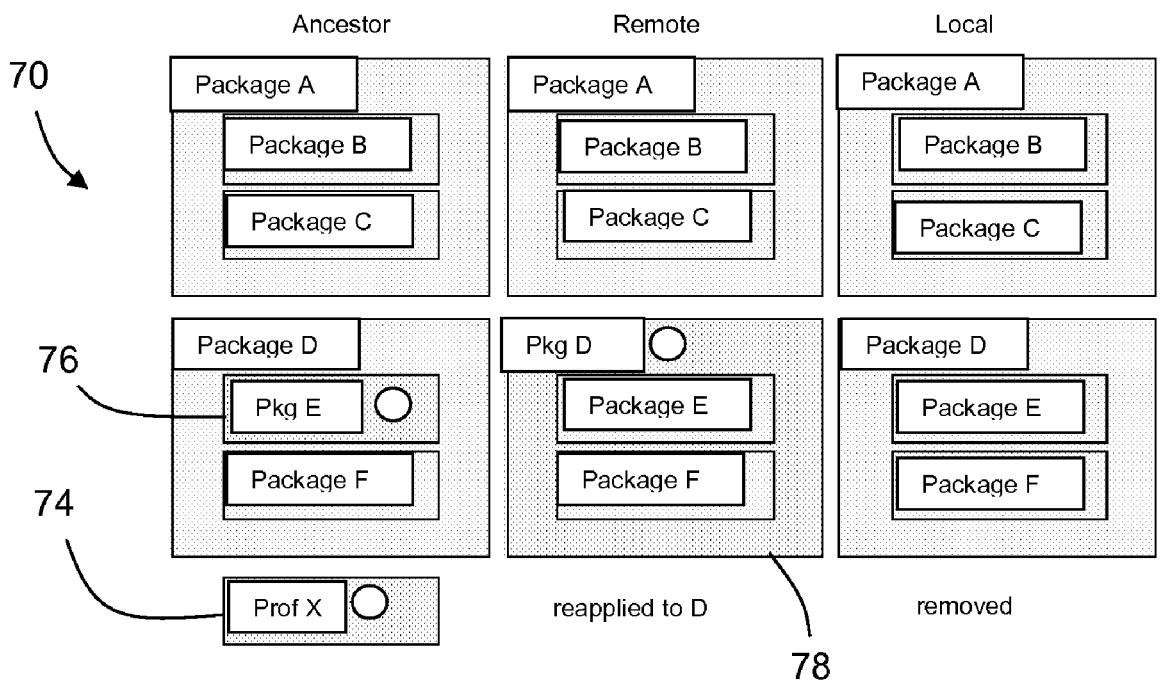
FIG. 4 depicts an illustration of normalizing profiles whose locations have changed in accordance with an embodiment of the present invention.
Figure 4:
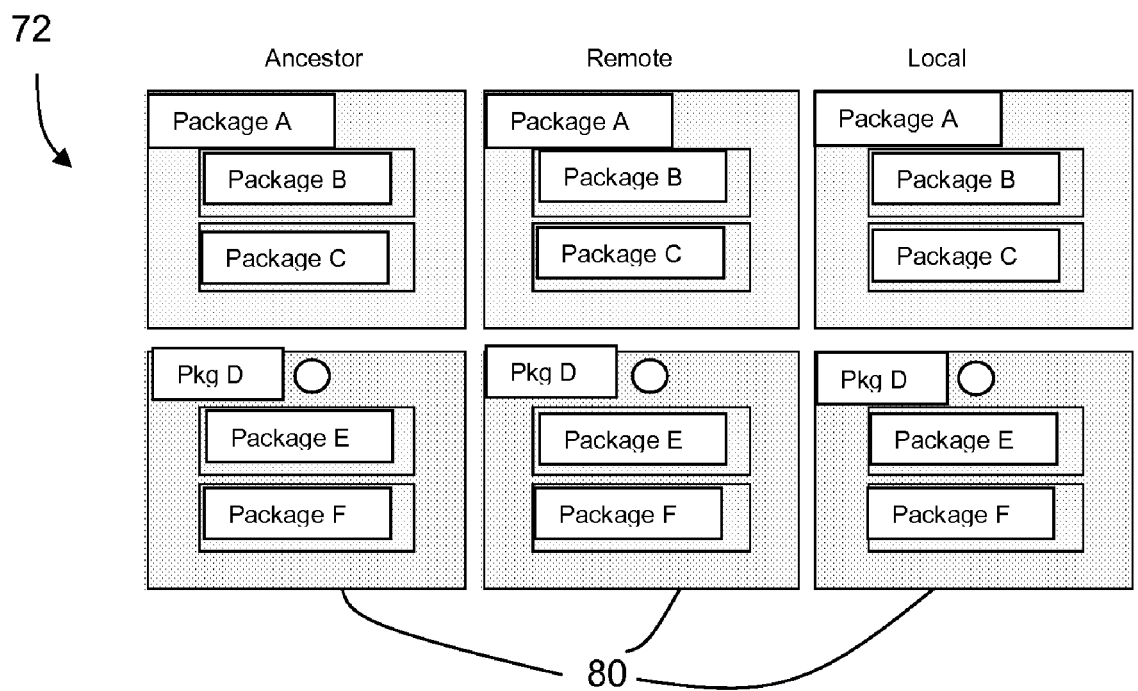

FIG. 4 depicts an example of how profile location change (within the model hierarchy) is handled and shows a before 70 and after 72 representation of an ancestor, remote and local version of a meta-model. In this example, profile X 74 was originally applied to just package E 76 in the ancestor version. In the remote version, profile X was reapplied up one hierarchical level to package D 78. In the local version, profile X was removed completely.

When a profile or a package with an applied profile is hierarchically moved within the model, the scope of the profile's visibility changes, resulting in subtle difficulties for the merge process. Profile location change system 30 (FIG. 1) causes the profile in each model to be hoisted up to highest hierarchical level at which the profile is applied in any of the models. This can be seen in the after representation 72 at the bottom of FIG. 4, in which profile X has been applied to package D 80 in each model.

Thus, profile location change system 30 (FIG. 1) recognizes if a profile is being applied at different hierarchical levels within the different versions of the meta-model, and ensures that the profile is applied to a highest hierarchical level in each of the versions of the meta-model.

Illustrative Methodology

The process described herein is applicable to arbitrary set of models with any number of profiles applied to some or all of the models. There are three data structures used in the methodology:

(1) Profile-to-Versions Map, which is a map that will associate specific profiles with an array of entries. There is an entry in the array for every model being analyzed. The entry keeps the version of this specific profile applied to that model.

(2) Profile-to-Applications Map Array is an array of maps. There is an entry in this array for each model being analyzed. Every such entry is a map that associates a specific profile with a list of applications for that profile in the model. Note that the "Profile Application" is an instance of the Profile applied to a specific Package of the model.

(3) Profiles-to-Migrate Map is a map that will store profiles to be migrated along with the required profile versions.

The first stage of the process is the preparation stage, in which the models are analyzed and information about profiles applied to the models is retrieved. This may be accomplished with the following algorithm:

For every model (loop)
    A list of all profile applications is retrieved;
    For every profile application (loop)
        information about the profile application is stored in the Profile-to-Applications Map Array;
        A version of the profile is stored in the Profile-to-Versions Map;

The next stage is the analysis stage, in which the profile versions are analyzed and a list of profiles to be migrated is populated. This may be accomplished with the following algorithm:

For every profile in the Profile-to-Versions Map (loop)
    An associated array of versions is retrieved from the map;
    The array of versions is analyzed
        If a given profile was not applied to a certain model, the model will be ignored;
        If all versions in the array are equal, no migration is required;
        If different versions of the profile are applied to the models, the profile is stored along with its greatest version in the Profiles-To-Migrate Map;

The next stage is the migration stage, in which inconsistent profiles detected in the "Analysis Stage" are migrated to the required version and verified. This may be accomplished with the following algorithm:

For every profile in the Profiles-to-Migrate Map (loop)
    For every model (loop)
        A list of applications of a given profile in this model is retrieved from the Profile-to-Applications Map Array;
        If there are no applications of a given profile in this model, the model is skipped;
        For every profile application (loop)
            Check the current profile application's version against the required version;
            If the current version is less than required, perform the profile migration;
            During the migration of the profile application in a given package to the latest version, all sub-packages will be automatically migrated to the latest profile as well.

Illustrative Location Change Process

If the meta-models differ by hierarchical scope of profile, the following variation may be utilized. If a package or classifier is moved to a different location in the model, its profile application scope is automatically adjusted so that stereotypes are still within the scope of the profile. In such a case, the scope of the meta-model addition has been either increased by moving the profile application upwards in the hierarchy, or decreased by moving it downwards in the package hierarchy.

Since this can be done arbitrarily for two contributors, the three meta-models can completely differ in their scope of application, and a generic extension to the above algorithm is needed to provide a common meta-model that can be used for all of the models.

In the preparation stage, a new map is needed, referred to herein as the profiles scope map. In the analysis stage, the profiles scope map is keyed by profile, with the data being a list of contributor scope entries, each of which contains the contributor and all of its packages in scope for that profile. After each contributor has been iterated, the scope for each profile is compared. For each model with less scope than the benchmark (the one with the highest scope), the profile is hoisted one level at a time until the scope meets or exceeds the benchmark. At that point, the models are scanned upwards to find a common point of application in order to complete the meta-model realignment.

In the migration stage, the profiles scope map is consulted, and each profile is applied to the common package. Care is taken to preserve the stereotype applications that are within the profile's scope.

Note that while the above embodiments are generally directed to situations in which a three-way comparison is required, it is understood that the scope of invention is not limited to three-way comparisons, e.g., the techniques can be readily applied to a two-way comparison. For instance, when a user is exploring model repository 32 (FIG. 1), it is possible to compare any two versions of a model or to compare a model to the latest version on the branch or to the previous version on the branch. All the commands would go through the same process of aligning the meta-models inside those instance documents before the compare engine proceeds.

Referring back to FIG. 1, it is understood that computer system 10 may be implemented using any type of computing device, and may be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, a computer system 10 comprising a meta-model alignment system 24 could be created, maintained and/or deployed by a service provider that offers the functions described herein for customers. That is, a service provider could offer to provide meta-model alignment services as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for processing meta-models defined in accordance with Meta Object Facility (MOF), comprising:
   a version control system for checking meta-models in and out of a model repository;
   a system for merging two versions of a meta-model that are based on a common ancestor version and were worked on in parallel; and
   an alignment system for aligning the two versions and the common ancestor whenever a profile has been applied differently to any of the two versions and common ancestor version.

2. The system of claim 1, wherein the alignment system includes a version mismatch system for recognizing if different profile versions are being applied to like packages within different versions of the meta-model, and for adjusting each like package within the different versions of the meta-model to a most recent profile version.

3. The system of claim 1, wherein the alignment system includes a profile mismatch system for recognizing if different profiles are being applied to like packages within different versions of the meta-model, and for ensuring that like packages within each of the different versions of the meta-model utilize a common profile.

4. The system of claim 1, wherein the alignment system includes a profile location change system for recognizing if a profile is being applied at different hierarchical levels within the two versions of the meta-model, and for ensuring that the profile is applied to a highest hierarchical level in each of the two versions of the meta-model.

5. The system of claim 1, wherein the two versions of the meta-model include a remote version and a local version that were checked out of the model repository during a same period of time, and wherein the remote version was checked back in first.

6. The system of claim 5, wherein the alignment system is initiated when the remote version was checked out as a copy of the ancestor version, modified and checked back in; and the local version was check out as a copy of the ancestor version, modified, and is being checked back in.

7. The system of claim 6, wherein the aligning is initiated when local version is being checked back in.

8. A computer program product stored on a computer readable medium, which when executed by a computer system, processes meta-models, the computer program product comprising:
   program code configured for checking meta-models in and out of a model repository;
   program code configured for merging two versions of a meta-model that are based on a common ancestor and were worked on in parallel; and
   program code configured for aligning the two versions and the common ancestor whenever a profile has been applied differently to any of the two versions and common ancestor.

9. The computer program product of claim 8, wherein the aligning includes recognizing if different profile versions are being applied to like packages within different versions of the meta-model, and for adjusting each like package within the version of the meta-model to a most recent profile version.

10. The computer program product of claim 8, wherein the aligning includes recognizing if different profiles are being applied to like packages within different versions of the meta-model, and for ensuring that like packages within each of the versions of the meta-model utilize a common profile.

11. The computer program product of claim 8, wherein the aligning includes recognizing if a profile is being applied at different hierarchical levels within the two versions of the meta-model, and for ensuring that the profile is applied to a highest hierarchical level in each of the two versions of the meta-model.

12. The computer program product of claim 8, wherein the two versions of the meta-model include a remote version and a local version that were checked out of the model repository during a same period of time to be worked on, and wherein the remote version was checked back in first.

13. The computer program product of claim 12, wherein the aligning is initiated when the local version is being checked back in.

14. The computer program product of claim 13, wherein the aligning causes an aligned set of versions of the meta-model to be generated and stored in the model repository.

15. A method for aligning versions of a meta-model within a meta-model processing system, comprising:
   providing an interface for checking meta-models in and out of a model repository;
   merging two versions of a meta-model that are based on a common ancestor and were worked on in parallel when a second one of the two versions is being checked back in; and
   aligning the two versions and the common ancestor whenever a profile has been applied differently to any of the two versions and common ancestor.

16. The method of claim 15, wherein the aligning includes recognizing if different profile versions are being applied to like packages within different versions of the meta-model, and for adjusting each like package within the version of the meta-model to a most recent profile version.

17. The method of claim 15, wherein the aligning includes recognizing if different profiles are being applied to like packages within different versions of the meta-model, and for ensuring that like packages within each of the versions of the meta-model utilize a common profile.

18. The method of claim 15, wherein the aligning includes recognizing if a profile is being applied at different hierarchical levels within the two versions of the meta-model, and for ensuring that the profile is applied to a highest hierarchical level in each of the two versions of the meta-model.

19. The computer program product of claim 8, wherein the two versions of the meta-model include a remote version and a local version that were checked out of the model repository during a same period of time, and wherein the remote version was checked back in first.

20. A system for processing meta-models, comprising:
   a system for comparing two versions of a model; and
   an alignment system for aligning associated meta-models of the two versions whenever a profile has been applied differently, wherein the alignment system includes a version mismatch system for recognizing if different profile versions are being applied to like packages within different versions of the meta-model, and for adjusting each like package within the different versions of the meta-model to a most recent profile version.

* * * * *